Patented Feb. 2, 1937

2,069,530

UNITED STATES PATENT OFFICE 2,069,530

CHEMICALLY STABILIZED GLUCOSIDES AND GLUCOSIDE BEARING DRUGS

Vincent A. Lapenta, Indianapolis, Ind.

No Drawing. Application May 9, 1934, Serial No. 724,763

2 Claims. (Cl. 167—65)

The invention relates to the protection and preservation of digitaloid or digitalis products against loss of medicinal power due to aging of such products; and more particularly to the stabilization of such products against deterioration, by combining same with a protector composed of about 500 milligrams of orthodihydroxybenzene (1:2) 10 milligrams of tetramethyl ammonium and about five milligrams of camphoric acid, such protector being added in proportions of about 60 milligrams to about 100 cc. tincture or solution of digitalis derivatives and with all water solutions of isolated glucosides, in the same proportions; and also being added to other aqueous solutions in the same proportions.

It is a primary object of the invention to combine said protector with powdered leaves, glucoside solutions, alcoholic solutions and aqueous solutions in general, to protect the same against loss of potency over the periods of time during which it is well known that deterioration otherwise regularly occurs.

It is also a primary object of the invention to combine with products of these classes a protector which is non-toxic, which has no cardiac effects when administered, but which exerts a powerful stabilization and protecting action on such products.

The above and other objects are attained by the methods and combination of products hereinafter described.

The special preparations of digitalis and digitaloid drugs, when added to this protector, are kept stabilized thereby for an indefinite period of time, as understood in the preservation of drugs, this preparation being found to stabilize against loss of potency by recognized biological tests.

Regarding the rate of deterioration of digitalis products, whether of alcoholic tincture or aqueous solution, in view of accrued accumulated knowledge from authoritative sources and from manufacturers, the general agreement is that digitalis products lose nearly 35% of their strength in the first 60 days following manufacture, after which the rate of deterioration proceeds gradually more slowly.

Most manufactures do not recommend the use of their products after one year. Experiments made throughout the world indicate that boiling digitalis products in a sealed ampoule for one hour induces as much deterioration as ordinarily takes place in one year. Peroxide deterioration tests usually cause as much deterioration as takes place in 15 to 18 months. Such tests are, therefore, well comparative with the action of time, oxidation, effect of light, etc.

With regard to the toxicity or cardiac action of discovered protective agents, the indication is clear that the quantities hereinafter described as added to 100 cc. of digitalis product whether a tincture or aqueous extract or not, have been ascertained by long and accurate research, as will be hereinafter described.

Said stabilized digitalis products are exposed to the action of hydrogen-peroxide activated by a few drops of blood to create nascent oxygen for as long as an hour, the thus protected combinations retaining all their potency compared to the unprotected, which show a loss of 28% to 46% by the same test. This test is more destructive than normally aging the combination one to two years.

I have combined said protector in the amounts indicated above with other drugs of the so-called digitalis group and found that it protects them against deteriorating agencies in a like manner with digitalis.

The drugs of the digitalis groups are hypocynum, squills, convallaria, adonis, and all are likewise efficiently combined, in carrying the invention into effect, with said protector and are likewise shown to be protected against loss of potency.

In further carrying out the invention, said protector is also combined as a protective ingredient with extracts, powdered extracts, powdered isolated extracts, purified extracts, powdered isolated glucosides, tinctures, fluid extracts, glucosides, hydro-alcoholic solutions, and practically all forms of aqueous solutions, and alcoholic solutions of digitalis and the other digitalis group of drugs above mentioned.

The use of said protector as above designated is totally harmless to the respective drug, and likewise harmless to the subjects upon which it is used, even when added in much greater proportions than necessary to protect the respective drug against deterioration.

The potency of all digitalis products and digitaloid drugs has been ascertained by the applicant by U. S. 1-hour frog method, in addition to which in this instance he has used as control, the gold fish method by Pittinger and the guinea pig method of Reed and Vandersleed.

The applicant has thus been able, by subjecting assayed digitalis and digitaloid drugs to various deteriorating agencies, to ascertain the amount of deterioration that has taken place.

The applicant has found that tetra-ethylammonium has a toxicity of milligrams .00072 per gram of animal. It takes milligrams 0.18 to kill a frog of 25 milligrams. These toxicity characteristics have been confirmed by applicant on gold fish and guinea pigs.

While the foregoing describes the use of the aforesaid protector as combined with digitalis and a number of the digitalis group of drugs, and classes of same, it is understood that the invention is not restricted to the particular examples shown, but that it may be carried out generally with powdered extracts, and all types of aqueous and alcoholic drugs containing glucosides with the same stabilizing and protective result.

The invention claimed is:

1. The combination of an aqueous solution of digitalis with a protector composed of about 500 milligrams of orthodihydroxybenzene (1:2) 10 milligrams of tetramethyl ammonium and about five milligrams of camphoric acid, such protector being added in the proportion of approximately 60 milligrams of protector to 100 cc. of the aqueous solution of digitalis for preserving same.

2. The combination of fluid extract of digitalis with a protector composed of orthodihydroxybenzene, tetramethyl ammonium, and camphoric acid.

VINCENT A. LAPENTA.